H. ESKELINEN.
MEASURING INSTRUMENT.
APPLICATION FILED MAY 31, 1917.
1,254,218.
Patented Jan. 22, 1918.
2 SHEETS—SHEET 1.
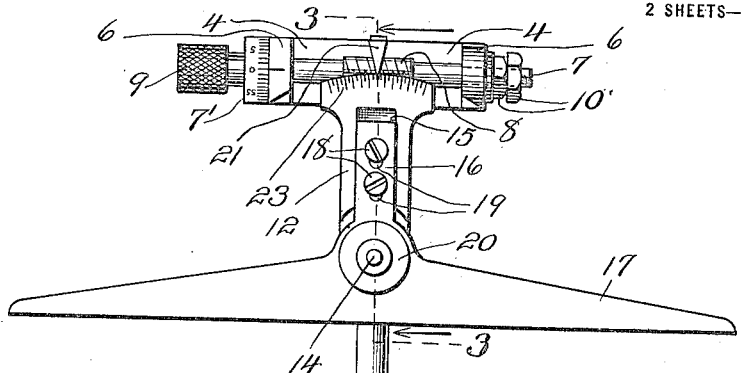
Fig. 1.
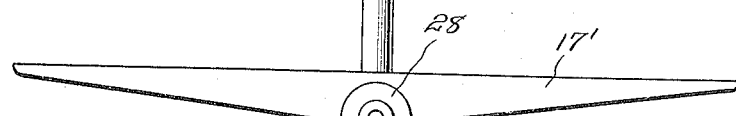
Fig. 7.
Fig. 4.
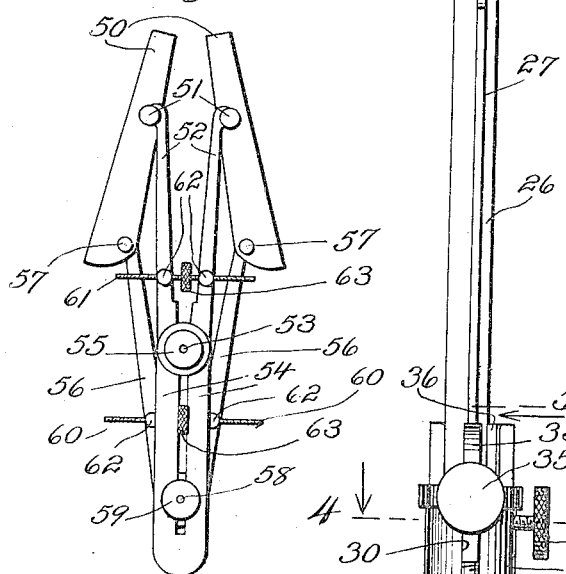
Witness;
J. P. Britt
Inventor;
Henry Eskelinen
By Geo. W. Young
Attorney H. ESKELINEN.
MEASURING INSTRUMENT.
APPLICATION FILED MAY 31, 1917.
1,254,218.
Patented Jan. 22, 1918.
2 SHEETS—SHEET 2.
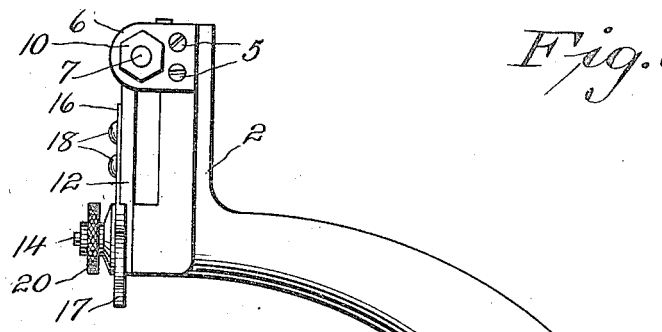
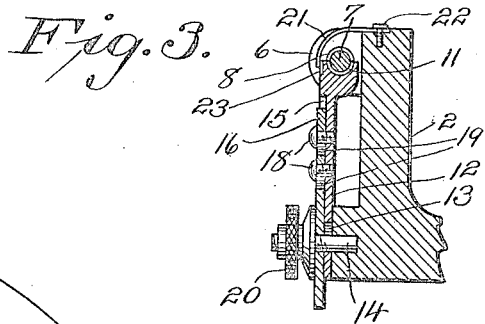
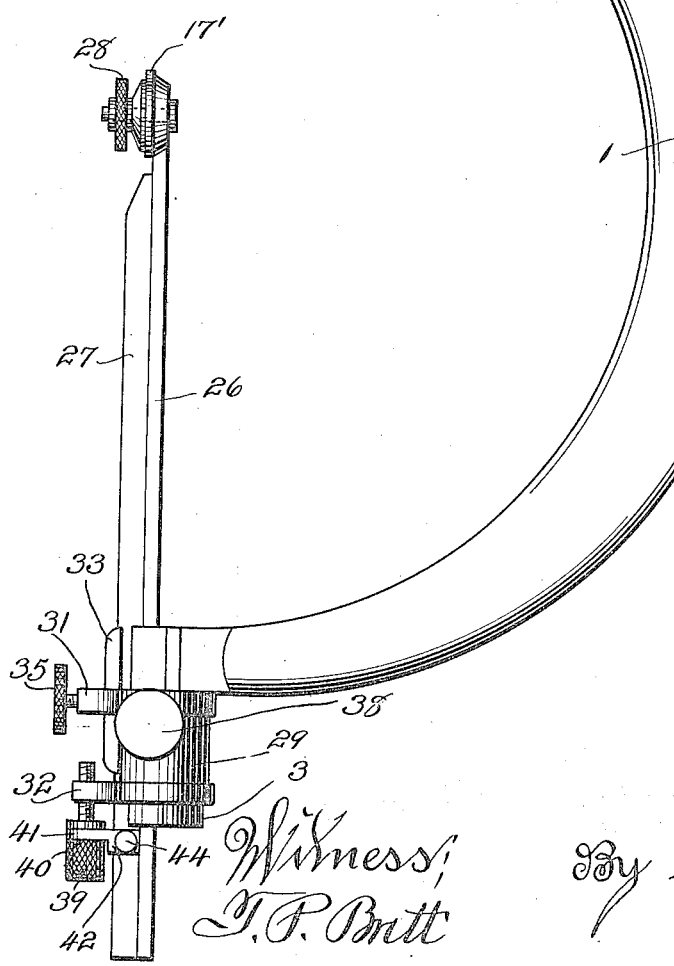
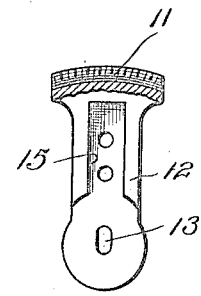
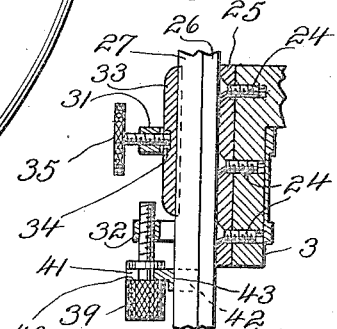
Inventor
Henry Eskelinen

UNITED STATES PATENT OFFICE.

HENRY ESKELINEN, OF MILWAUKEE, WISCONSIN.

MEASURING INSTRUMENT.

1,254,218. Specification of Letters Patent. Patented Jan. 22, 1918.

Application filed May 31, 1917. Serial No. 171,809.

*To all whom it may concern:*

Be it known that I, HENRY ESKELINEN, a citizen of Russia, and resident of Milwaukee, in the county of Milwaukee and State of Wisconsin, have invented certain new and useful Improvements in Measuring Instruments; and I do hereby declare that the following is a full, clear, and exact description thereof.

My invention relates to new and useful improvements in measuring instruments and refers especially to instruments for obtaining the taper of a shaft or bore.

My invention has for its primary object to reduce the amount of time formerly required to obtain the taper of a shaft in order that a bore may be made of equal taper to receive the same.

Another object is to provide, in addition to the means for obtaining the taper of a shaft, means adapted to be adjusted from the first named means to assist in obtaining a bore of equal taper to that of the shaft.

A further object is to provide a measuring instrument of the character described which will be of such simple construction that any mechanic may readily use the same and which will be practical from every standpoint.

With the above and other objects in view which will appear as the description proceeds, my invention resides in the novel construction, combination, and arrangement of parts substantially as hereinafter described and particularly defined by the appended claims, it being understood that such improvements in the precise embodiment of my invention may be made as come within the scope of the claims.

In the accompanying drawings I have illustrated one complete example of the physical embodiment of my invention constructed according to the best mode I have so far devised for the practical application of the principles of my invention, in which;

Figure 1 is a top plan view of the instrument I employ for obtaining the taper of a shaft.

Fig. 2 is a side elevational view thereof.

Fig. 3 is a longitudinal section through one end of this instrument, the section being taken along the plane indicated by line 3—3 of Fig. 1.

Fig. 4 is a transverse sectional view through the other end thereof, the section being taken along the line indicated by line 4—4 of Fig. 1.

Fig. 5 is a longitudinal sectional view through the end of the instrument opposite Fig. 3 and taken on line 5—5 of Fig. 1.

Fig. 6 is a detail plan view part in section and part in top plan view of the pivoted lever for setting one of the blades of my device, and Fig. 7 is a top plan view of the instrument I employ for obtaining the taper of bores.

The instrument which I employ for ascertaining the taper of various shafts comprises a yoke shape frame member 1 having its ends 2 and 3 extending laterally therefrom on an even horizontal plane. The end 2 is formed with a pair of laterally extending arms 4 and secured thereon by suitable fastenings 5 are bearings 6 for the shaft 7 provided intermediate its ends with a worm gear 8, having one end shouldered as at 7' and formed with a knurled head 9 and its other end rotatably secured in the bearings 6 by means of nuts 10.

The worm gear 8 is adapted to mesh with the threaded channel 11 of an arm 12 which has its inner end formed with an elongated opening 13 adapted to engage a pivot 14 having its inner end secured in the yoke member. This arm 12 is adapted to describe an arc and is channeled as at 15 to receive the arm 16 of a blade member 17, said blade member being secured to the arm 12 by means of suitable fastenings 18 engaging elongated slots 19 in the arm 16, the arm 12 carrying blade member 17 being adapted to be retained in any adjusted position by means of a knurled binding nut 20 engaging the outer threaded end of the pivot 14.

In order to ascertain the degree of taper, a pointer arm 21 is provided, secured by suitable fastenings 22 to the outer end of the arm 12, and projects over the upper face of the pivoted arm 12, it being brought to a point exactly central of the instrument and adapted to register with suitable graduations 23 upon the upper face of said arm 12 near its outer peripheral edge.

The shouldered portion 7' of the shaft 7 is graduated or divided into sixty minutes to permit a fine or micrometric adjustment of the blade 17 to dispense with the use of calipers; this arrangement being in the nature of a micrometer, and working with the graduations 23 for the adjustment of the blades as will be readily understood.

As will be obvious when the worm gear 8 is revolved, the blade 17 is rocked one way or the other, the pointer 21 designating the angle at which the same is set and the nut 20 retaining the same in adjusted position. When it is desired to set this blade member independent of the worm gear 8, the fastenings 18 are loosened to allow the arm 12 to slide from engagement with the worm gear 8 when the same are again tightened, the elongated openings 19 and 13 permitting this adjustment.

The end 3 of the yoke 1 has secured thereon, by means of suitable fastenings 24 a slide bearing 25 for a slide bar 26 which is formed on its upper face with an upstanding guide flange 27 and has pivoted to its inner end a blade member 17' similar to the blade 17 and adjustably secured to the arm 26 by means of a binding nut 28. This bar 26 is slidable in its bearing 25 longitudinally with respect to the yoke member 1 and for securing the same in the bearing 25 and for retaining the bar 26 in adjusted position a sleeve or collar 29 is employed fitting over the end 3 and having therein a slot or guide opening 30 for the flange 27 of the bar 26, and formed on the sleeve or collar of each end thereof are the up-standing guides 31 and 32 also provided with suitable guide openings for the flange 27.

Mounted in the opening of guide 31 is a binding wedge or key 33 being grooved in its under face for engagement with the flange 27 and having a notch 34 in its upper face for engagement with a binding screw 35 carried by the guide 31. The binding means just described serves to retain the arm 26, in any desired restricted or extended position, and also to retain the said arm from dropping below the proper horizontal plane when fully extended, as will be obvious.

To prevent lateral movement of the bar 26, a second wedge or key member 36 is employed engaging one peripheral edge of the bar and provided with the central notch 37 for receiving the end of a knurled binding screw 38 having threaded engagement with the sleeve 29 and bearing 25, this key 36 being located in the sleeve or bearing 29 and 25 as will be readily seen by reference to Fig. 4.

When it is desired to make a fine adjustment of the bar 26, an adjusting screw 39 is employed engaging the threaded opening of the guide 32, this screw having an annular groove as at 40 adapted to receive the upstanding ears or lugs 41 of a collar 42 which is slotted as at 43 to receive the flange 27, and has a binding screw 44 to bind against the flange 27. As will be obvious when this adjusting device is used, the binding screws 35 and 38 are loosened, the set screw 44 is tightened, and the turning of the screw 39 will then give the slight adjustment desired when the screws 35 and 38 are again tightened to bind the bar 26 in adjusted position.

As will be apparent when it is desired to turn a shaft of a given taper, the blade member 17 is adjusted until the pointer 21 is registering with the proper graduation of the arm 12, when the same is locked in that position by means of the nut 20, and then the bar 26 is moved forward and the blade 17 is adjusted to correspond with the blade 17' when the bar 26 is then retracted. Then the blade member 17 is adjusted until the pointer 21 reads at the same degree, only reading from the center in a direction opposite to that at which the same was previously set.

When it is desired to obtain the taper of a shaft already turned, it will be obvious that the blade members 17 and 17' are merely adjusted to the shaft when the taper may be readily obtained.

Having thus described the instrument I employ for obtaining the taper of shafts, I will now describe the instrument I use in connection therewith for obtaining the taper of bores, or for assisting in the tapering of bores which consist of the caliper like member comprising a pair oppositely inclined blade members 50 having pivoted at 51 near their outer ends, the ends of a pair of like arms 52 having their inner ends pivoted at 53 to a slotted member 54 and held in adjusted position by means of the clamping nuts 55; and the pair of arms 56 similar to arms 52 having their inner ends pivoted at 57 to the inner ends of blade members 50 and their outer ends pivoted at 58 to member 54 and secured in adjusted position by means of the binding nuts 59.

As will be readily understood the adjusting of the distance between the ends of arms 56 and 52 changing the inclined or tapered relation of blade members 50, and for varying the incline of members 50 the oppositely threaded screw members 60 and 61 are employed engaging lugs 62 of the arms 52 and 56 and having formed on the intermediate portion thereof a knurled head 63 for obtaining the desired adjustment.

From the foregoing description, taken in connection with the accompanying drawings, it is thought that my invention will be readily understood and hence further explanation thereof is thought unnecessary, and it will be appreciated that while the yoke member 1 is generally made of aluminum, any other metal may be used which will provide a light instrument.

What is claimed is:—

1. A measuring device as described comprising a yoke frame the arms of which are provided with portions extending laterally of said arms, a blade member adjustably secured to one of said portions, a bar slidably mounted in the other of said portions, and a second blade member adjustably secured to the inner end of said bar.

2. A measuring instrument as described comprising a yoke frame member, the arms of which are provided with portions extending laterally of said arms, a blade member adjustably secured to one portion thereof, an arm slidably mounted in the other of said portions, a second blade member adjustably carried by the inner end of said arm, and means in connection with the first blade member for securing the micrometric adjustment of the instrument substantially as described.

3. A measuring instrument as described comprising a yoke frame member, the arms of which are provided with portions extending laterally of said arms, a blade member adjustably secured to one portion of said frame, a second blade member adjustably carried by the other portion of said frame, transversely alined ears formed on the portion of said frame carrying the first named blade, and means journaled in said ears and connected with the first blade member for securing the micrometric adjustment of the instrument substantially as described.

4. A measuring instrument as described, comprising, in combination, a yoke frame the arms of which are provided with portions extending laterally of said arms and on an even horizontal plane, a blade member adjustably pivoted to one portion of the yoke, means for adjusting the angle of said blade with respect to said yoke, a bar slidably mounted in the other portion of said yoke, means for securing said bar in adjusted position, and a second blade member adjustably pivoted to the inner end of said bar, and adjustable with relation to the other blade member substantially as described.

5. A measuring instrument as described comprising, in combination, a yoke frame the arms of which are provided with portions extending laterally of said arms, a frame having its inner end pivoted to one portion of the yoke and having its other end channeled and screw threaded, a worm gear shaft engaging the screw threaded channel of said frame for adjusting the same, a blade member mounted upon said pivoted frame, a bar slidably mounted in the other portion of the yoke and slidable longitudinally with respect to said yoke, means for retaining said bar in adjusted position, and a second blade member adjustably mounted upon the inner end of said bar and co-acting with the first named blade member substantially as described.

In testimony that I claim the foregoing I have hereunto set my hand at Milwaukee, in the county of Milwaukee and State of Wisconsin.

HENRY ESKELINEN.

Copies of this patent may be obtained for five cents each, by addressing the "Commissioner of Patents, Washington, D. C."